United States Patent [19]

Aplin, Sr.

[11] 4,144,944
[45] Mar. 20, 1979

[54] DRIVE AND STEERING MECHANISM FOR A VEHICLE

[75] Inventor: George E. Aplin, Sr., Andalusia, Ala.

[73] Assignee: Fred R. Posey, Jr., Birmingham, Ala.; a part interest

[21] Appl. No.: 843,815

[22] Filed: Oct. 20, 1977

[51] Int. Cl.² ............... B62D 11/00; B62D 51/06
[52] U.S. Cl. .................... 180/6.2; 180/19 R
[58] Field of Search ............ 180/19 H, 19 S, 19 R, 180/6.2, 6.66, 6.5, 6.6, 9.48; 192/67 R, 49; 74/242.1 R

[56] References Cited

U.S. PATENT DOCUMENTS

| 657,650 | 9/1900 | Dyer | 74/242.1 R |
| 1,588,013 | 6/1926 | Dallmann | 192/67 R |
| 2,739,657 | 3/1956 | Howard | 192/49 X |
| 3,294,187 | 12/1966 | Ruf | 180/6.66 |
| 3,938,400 | 2/1976 | Konyha | 180/6.66 X |

Primary Examiner—John A. Pekar
Attorney, Agent, or Firm—Woodford R. Thompson, Jr.

[57] ABSTRACT

Drive and steering mechanism for a vehicle embodying a frame supported by a pair of transversely spaced wheels separately connected to a pair of transverse shafts rotatable about a common axis with adjacent ends being rotatable relative to each other. A sleeve mounted non-rotatably on adjacent ends of the shafts is movable axially of the shafts to a first position in contact with both ends of the shafts so that both shafts rotate as a unit and to a second position in engagement with only one of the adjacent ends. Drive means connected to one of the shafts rotates the same while the sleeve is in the second position and rotates both shafts while the sleeve is in the first position.

1 Claim, 9 Drawing Figures

DRIVE AND STEERING MECHANISM FOR A VEHICLE

BACKGROUND OF THE INVENTION

This invention relates to a drive and steering mechanism for a vehicle, such as a self-propelled garden tractor, lawn mower and the like.

As is well known in the art to which my invention relates, difficulties have been encountered in providing simplified mechanism for turning a self-propelled vehicle, such as a garden plow, due to the fact that the ground engaging wheels must rotate independently of each other as a turn is made. Accordingly, very complicated assemblies have been proposed heretofore for steering self-propelled vehicles, such as that disclosed in the Goodwin U.S. Pat. No. 2,892,505, the Hardy et al U.S. Pat. No. 2,626,671, the Snavely U.S. Pat. No. 3,255,834, the White U.S. Pat. No. 2,936,840 and the Robinson et al U.S. Pat. No. 2,778,437. Also, idler pulleys have been employed to apply tension to V-belt drives and split pulleys having movable sections have been employed to transmit rotary motion from one rotary member to another, such as that shown in the Mullet U.S. Pat. No. 3,360,999 and the Konyha U.S. Pat. No. 3,938,400.

SUMMARY OF THE INVENTION

In accordance with my invention, I provide simplified mechanism for steering a self-propelled vehicle whereby the operator may selectively shift the apparatus into one position which permits driving both ground engaging wheels as a unit and into another position which permits only one ground engaging wheel to be driven while the other ground engaging wheel is adapted for free rotation. I accomplish this by providing a pair of transverse shafts rotatable about a common axis with adjacent ends being rotatable relative to each other. A sleeve-like member is mounted non-rotatably on adjacent ends of the shafts and is movable axially of the shafts selectively to a first position in contact with both ends of the shafts and to a second position in engagement with only one of the adjacent ends. Power drive means is operatively connected to one of the shafts for rotating only this shaft while the sleeve is in the second position. While the sleeve is in the first position, both shafts are driven as a unit to impart rotation to both ground engaging wheels.

DESCRIPTION OF THE DRAWINGS

Apparatus embodying features of my invention is illustrated in the accompanying drawings, forming a part of this application, in which.

DETAILED DESCRIPTION

Figure 4:
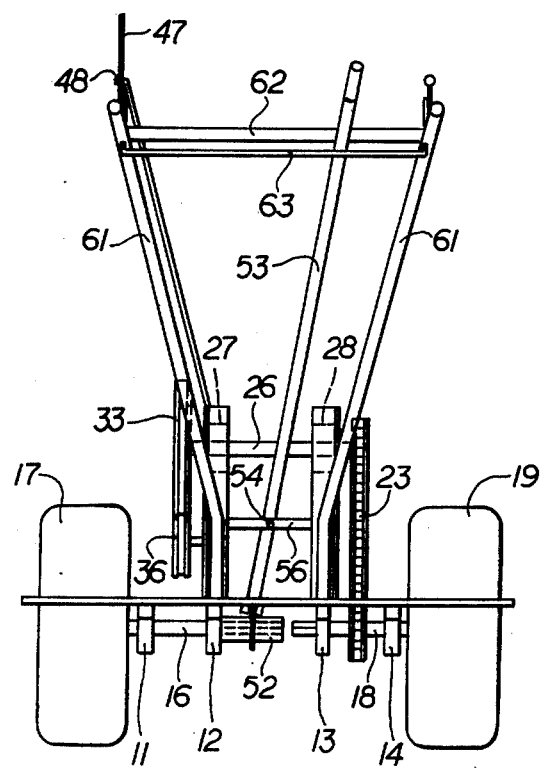
FIG. 4 is a rear elevational view of the apparatus shown in FIGS. 1-3, with the plows being omitted.
Figure 5:
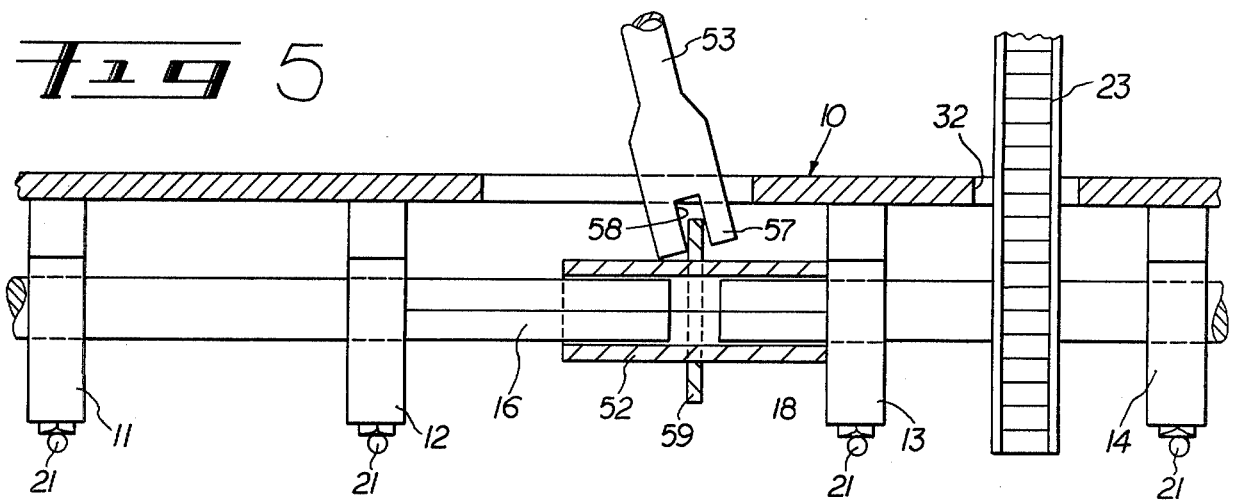
FIG. 5 is an enlarged, fragmental, sectional view showing the transverse shafts connected to each other for rotation as a unit.
Figure 6:
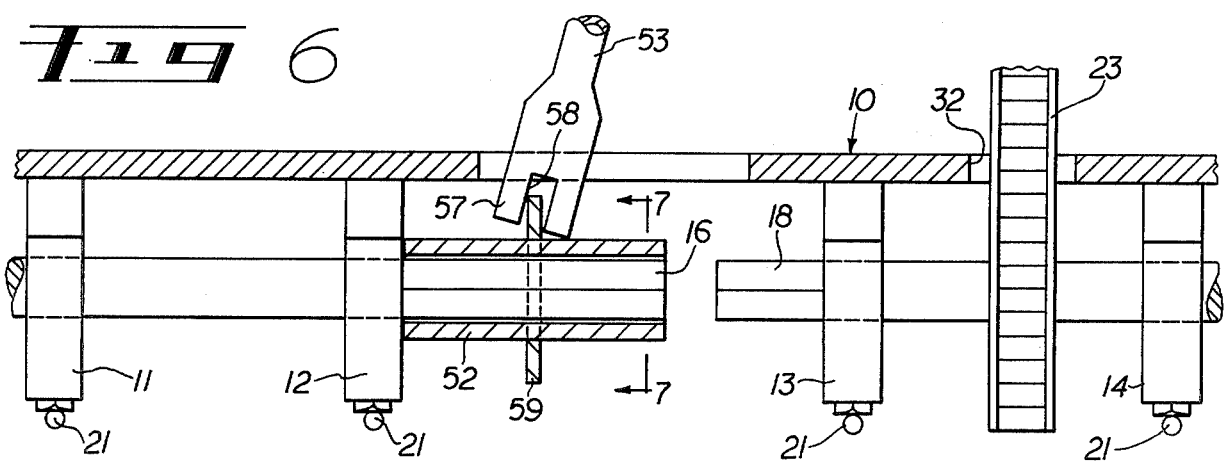
FIG. 6 is a fragmental, sectional view corresponding to FIG. 5, showing the mechanism in position to disconnect one transverse shaft from the other whereby only the shaft operatively connected to the drive means is driven.

Referring now to the drawings for a better understanding of my invention, I show a plate-like frame 10. Secured to and depending from the under surface of the plate-like frame 10 are spaced apart bearing support members 11, 12, 13 and 14. The bearing support members 11 and 12 rotatably support a transverse shaft 16 which is connected to a ground engaging wheel 17. The bearing support members 13 and 14 rotatably support a transverse shaft 18 which is connected to a ground engaging wheel 19. As shown in FIGS. 5 and 6, suitable grease fittings 21 are provided on the bearing members 11, 12, 13 and 14. The shafts 16 and 18 are thus separately connected in driving relation with the wheels 17 and 19 and are rotatable about a common axis with adjacent ends of the shafts 16 and 18 being adapted for rotation relative to each other, as clearly shown in FIGS. 4, 5 and 6.

Figure 2:
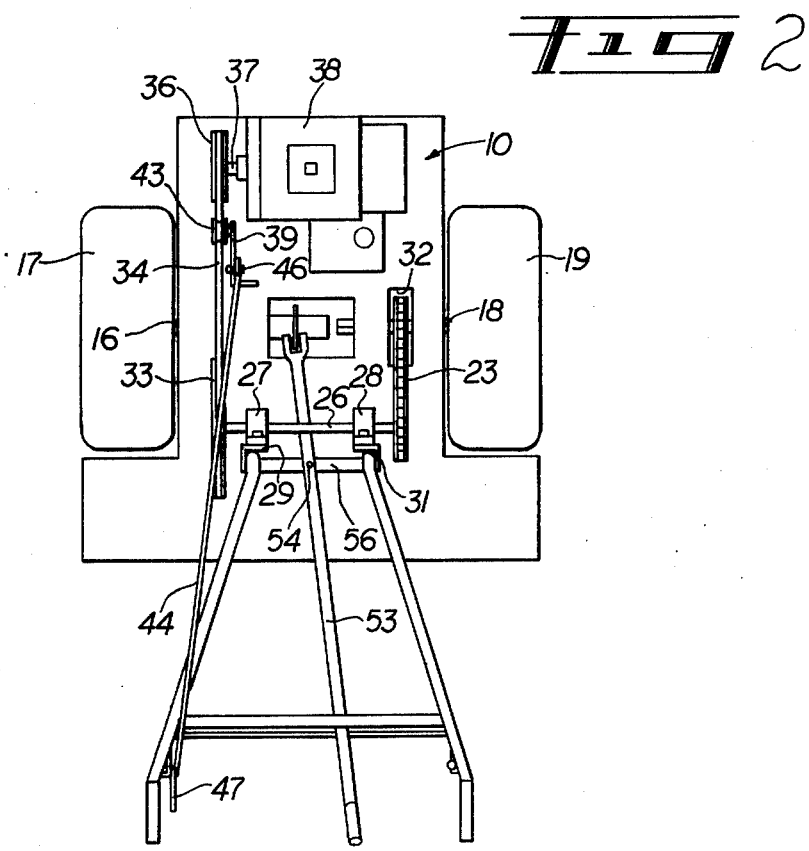
FIG. 2 is a top plan view of the apparatus shown in FIG. 1, with the plows being omitted.

Mounted on the shaft 18 is a sprocket 22 which is connected by a chain 23 to a sprocket 24 mounted on an idler shaft 26. As shown in FIG. 2, the idler shaft 26 is supported by suitable bearings 27 and 28 which are secured to upstanding support members 29 and 31, respectively. Also, as shown in FIG. 2, an elongated opening 32 is provided in the plate-like member 10 for receiving the sprocket 22 and the chain 23.

Figure 1:
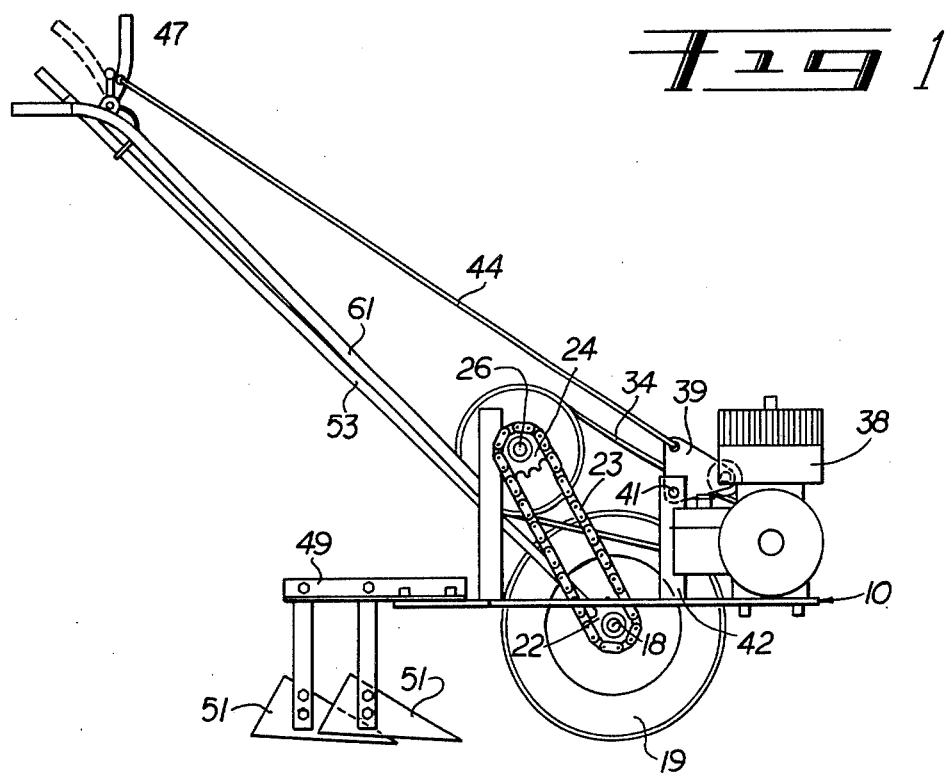
FIG. 1 is a side elevational view showing my drive and steering mechanism associated with a conventional type garden tractor.
Figure 3:
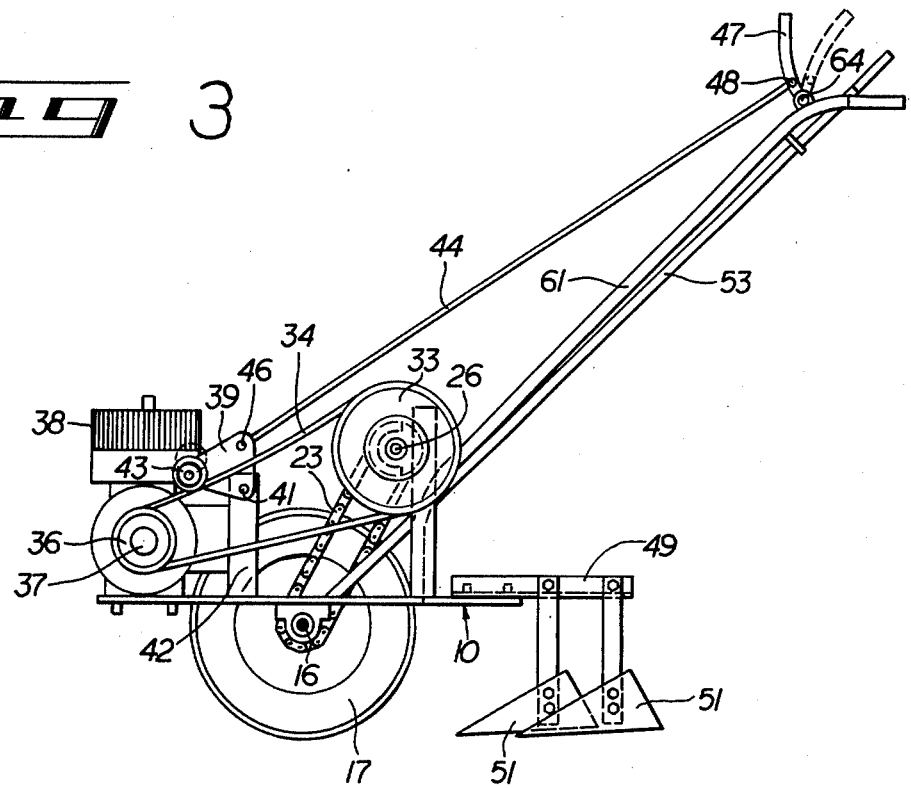
FIG. 3 is a side elevational view showing the opposite side of the apparatus from that shown in FIG. 1.

Mounted adjacent the end of the idler shaft 26 opposite the end thereof carrying the sprocket 24 is a pulley 33 which is operatively connected by a V-belt 34 to a pulley 36 which in turn is mounted on a drive shaft 37 for a suitable power unit, such as an internal combustion engine 38. As shown in FIGS. 1-3, a bracket 39 is pivotally connected by a pivot pin 41 to an upstanding bracket 42 carried by the plate-like frame 10. The bracket 39 carries a grooved roller 43 which is adapted to engage the upper flight of the V-belt 34 whereby upon moving the roller 43 toward the belt 34, the pulleys 33 and 36 are connected in driving relation to each other. On the other hand, upon moving the grooved roller 43 away from the belt 34, the belt is loosened whereby the pulleys 33 and 36 are no longer connected in driving relation to each other. To move the roller 43 toward and away from the belt 34, an elongated actuating rod 44 is pivotally connected at one end, as at 46, to the bracket 39. The other end of the rod 44 is pivotally connected to a lever 47 as at 48. Accordingly, upon moving the lever 47 forward, the roller 43 is moved toward the belt 34 to thus connect the pulleys 33 and 36 in driving relation to each other whereby rotary motion is imparted to the idler shaft 26, which in turn drives the transverse shaft 18 through the sprocket 24, chain 23 and sprocket 22, as shown in FIG. 1.

As shown in FIGS. 1 and 3, the plate-like frame 10 may carry a suitable plow assembly, indicated generally at 49 whereby the vehicle would be used as a garden tractor. The plow assembly 49 would carry conventional ground working tools, such as plow elements 51.

In view of the fact that the plow assembly 49 may be of any conventional type which will suggest itself to one skilled in the art, no further description thereof is deemed necessary. Also, it will be apparent that other attachments may be carried by the frame 10, such as a lawn mower, snow plow and the like.

Figure 7:
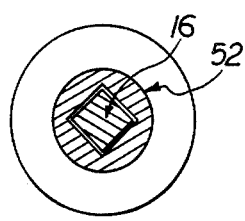
FIG. 7 is a sectional view taken generally along the line 7—7 of FIG. 6.

As shown in FIGS. 5, 6 and 7, the ends of the transverse shafts 16 and 18 are not round but are preferably of a polygonal shape, as viewed in cross section, as clearly shown in FIG. 7. Mounted for axial movement along the adjacent end portions of the shafts 16 and 18 is a sleeve-like member 52 which has an inner surface of a shape corresponding to the outer surface of the portions of the shafts 16 and 18 engaged by the shaft-like member 52. Accordingly, the sleeve-like member 52 is mounted non-rotatably on the adjacent ends of the shafts 16 and 18 but is adapted for axial movement relative thereto selectively to a first position shown in FIG. 5 and a second position shown in FIG. 6. That is, in the first position, the sleeve-like member 52 is in engagement with both of the adjacent end portions of the shafts 16 and 18 whereby both shafts rotate as a unit. On the other hand in the second position, the sleeve-like member 52 is in engagement with only the end portion of the shaft 16 whereby the transverse shafts 16 and 18 rotate relative to each other.

To move the sleeve-like member 52 selectively to the position shown in FIGS. 5 and 6, an elongated actuating member 53 is pivotally connected by a pivot pin 54 to a transverse support 56 which is carried by the upstanding support members 29 and 31, as shown in FIG. 2. The lower or forward end of the actuating member 53 carries a fork-like member 57 which is provided with a recess 58 for engaging an annular member 59 carried by the sleeve-like member 52. The rear end of the actuating member 53 extends upwardly and rearwardly between a pair of upwardly and rearwarding extending handles 61 which are connected at their lower ends to the plate-like frame 10. As shown in FIG. 4, the upper portions of the handle members 61 are connected to each other by a transverse bar 62. Extending between the upper ends of the handle members 61 and in spaced relation to the under surface of the transverse bar 62 is a transverse member 63 which is adapted to support the upper portion of the actuating member 53. That is, the upper end of the elongated actuating member 53 is adapted to move between the transverse members 62 and 63, as shown in FIG. 4. Also, as shown in FIG. 3, the lower end of the lever 47 is pivotally connected as at 64 to one of the handle members 61 whereby it is in easy reach of the operator.

From the foregoing, the operation of my drive and steering mechanism for a vehicle will be readily understood. Rotary motion is imparted to the transverse shaft 18 by moving the lever 47 forward to thus move the roller 43 toward and into engagement with the belt 34 whereupon rotary motion is imparted to the idler shaft 26 which in turn imparts rotation to the sprocket chain 23 and its sprockets.

To turn the vehicle toward the left, as viewed in the direction of travel, the actuating member 53 is shifted to the position shown in FIG. 6 whereby the sleeve-like member 52 is moved out of engagement with the adjacent portion of the transverse shaft 18, thus permitting the shafts 16 and 18 to rotate independently of each other. The lever 47 is then moved downwardly to tighten the drive belt 34, as described above, whereby rotary motion is imparted through the idler shaft 26 to the transverse shaft 18 to cause the wheel 19 at the right side of the vehicle to rotate forwardly around the stationary wheel 17 at the left side of the vehicle. That is, since the shafts 16 and 18 are not connected in driving relation with each other, the shaft 16 remains idle while the shaft 18 rotates the wheel 19 to make a turn to the left.

To move forward, the actuating member 53 is moved to the position shown in FIG. 5 whereby the sleeve-like member 52 moves into engagement with the shaft 18 to thus connect the shafts 16 and 18 in driving relation with each other whereby rotary motion imparted to the shaft 18 is also imparted to the shaft 16.

To make a turn to the right, as viewed in the direction of travel, the actuating member 53 is moved to the position shown in FIG. 6 whereby the shafts 16 and 18 are rotatable relative to each other. The upwardly and rearwardly extending handles 61 are then moved toward the left, as viewed in the direction of travel, whereby the wheel 17 is moved around the wheel 19 while wheel 19 is in a stationary position. That is, the roller 43 is moved away from the drive belt 43 whereby no rotary motion is imparted to the shaft 18 as the turn is made to the right.

Figure 8:
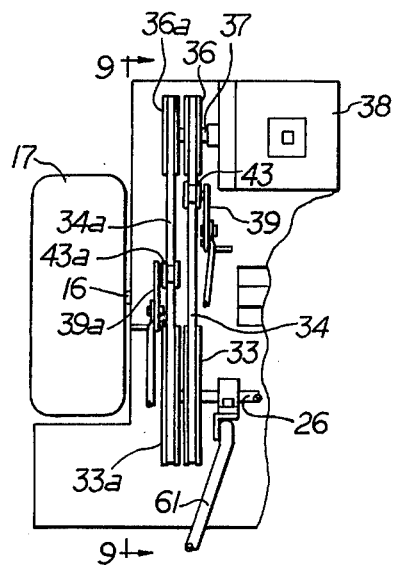
FIG. 8 is a fragmental, top plan view showing a modification wherein means is provided for rotating the transverse driven shaft selectively in opposite directions; and, FIG. 9 is a sectional view taken generally along the line 9—9 of FIG. 8.
Figure 9:
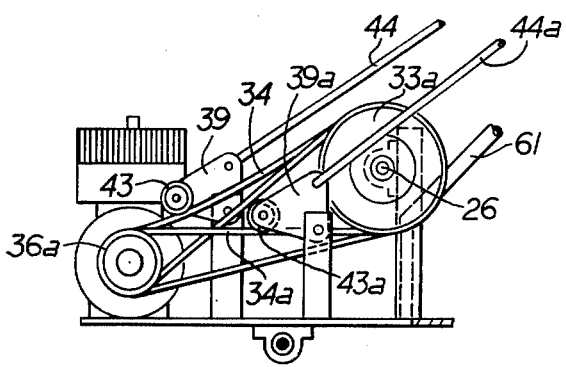

In FIGS. 8 and 9, I show a modified form of my invention in which additional pulleys $33^a$ and $36^a$ are mounted on the idler shaft 26 and the power shaft 37, respectively. The pulleys $33^a$ and $36^a$ are in alignment with each other and are connected by a crossed drive belt $34^a$ which causes the idler shaft 26 to rotate in a direction opposite the direction of rotation imparted thereto by the drive belt 34. A pivoted bracket $39^a$ carrying a roller $43^a$ is adapted to move toward and engage the belt $34^a$ whereby the pulley $36^a$ is connected in driving relation with the pulley $33^a$. On the other hand, upon moving the roller $43^a$ away from the belt $34^a$, the pulleys $33^a$ and $36^a$ move relative to the belt $34^a$ whereby the pulleys are no longer in driving relation with each other. The pivoted bracket $39^a$ is connected to an actuating rod $44^a$ which is actuated in the identical manner as actuating rod 44.

The operation of the apparatus shown in FIGS. 8 and 9 is identical to the operation of the apparatus shown in FIGS. 1-7 with the exception of the additional pair of pulleys $33^a$ and $36^a$ and the crossed belt $34^a$, together with the means for tightening and loosening the belt $34^a$, as described above. That is, when the apparatus is moved forward or a lefthand turn is made, the apparatus would operate in the same manner as described hereinabove. On the other hand, to make a turn to the right, as viewed in the direction of travel, the idler pulley 43 would be moved away from its belt 34 while the idler pulley $43^a$ would be moved toward its belt $34^a$ to thus cause the crossed belt $34^a$ to drive the idler shaft 26 in a reverse direction to the direction of rotation imparted by the drive belt 34. Accordingly, as the idler shaft 26 rotates in a reverse direction, reverse direction is also imparted to the transverse shaft 18 whereby the ground engaging wheel 19 would move rearwardly around the stationary wheel 17 while the sleeve-like member 52 is in the position shown in FIGS. 4 and 6. Accordingly, a turn would be made toward the right as the wheel 19 is pivotively rotated by the power unit 38 rather than having to move the handle 61 toward the left to rotate the wheel 17 around the wheel 19 as a turn is made to the right. It will thus be seen that with the apparatus shown in FIGS. 8 and 9, a turn may be made to the left by moving the sleeve-like member 52 to the position shown in FIG. 4 and then moving the idler pulley 43 into engagement with its belts 34 whereby the ground engaging wheel 19 rotates around the ground engaging wheel 17. On the other hand, a turn may be made to the right by moving the sleeve-like member 52 to the position shown in FIG. 4 and then moving the idler pulley 43$^a$ toward its belt 34$^a$ whereby reverse rotation is imparted to the ground engaging wheel 19 whereby it rotates rearwardly around the stationary ground engaging wheel 17.

From the foregoing, it will be seen that I have devised improved drive and steering mechanism for a vehicle. By providing apparatus which is simple of construction, economical of manufacture and apparatus which may be operated by unskilled labor, I find that my apparatus is particularly adapted for use as a garden tractor and the like. Also, by providing means which may be quickly actuated to make a turn to the left or to the right, a minimum of damage is done to the foliage in a garden as the apparatus is turned at the end of a row in a garden. Furthermore, my improved apparatus is safe in operation due to the fact that operation of the apparatus may be readily stopped or started by control means which is in easy reach of the operator.

While I have shown my invention in but two forms, it will be obvious to those skilled in the art that it is not so limited, but is susceptible of various other changes and modifications without departing from the spirit thereof.

What I claim is:

1. In drive and steering mechanism for a vehicle having a frame supported by a pair of transversely spaced ground engaging wheels, the improvement comprising:
    (a) a pair of transverse shafts separately connected in driving relation with said wheels and being rotatable about a common axis with adjacent ends of said shafts being adapted for rotation relative to each other and having outer surfaces which are out of round as viewed in transverse cross section,
    (b) an elongated sleeve member mounted non-rotatably on said adjacent ends of said shafts with the inner surface of said sleeve member being of a shape corresponding to that of said outer surfaces of said adjacent ends of said shafts and adapted for axial movement relative thereto selectively to a first position in engagement with both of said adjacent ends whereby both shafts rotate as a unit and to a second position in engagement with only one of said adjacent ends whereby said shafts are rotatable relative to each other,
    (c) drive means operatively connected to one of said shafts for imparting rotary motion thereto,
    (d) an elongated actuator member having one end extending rearwardly of said frame with its other end operatively connected to an annular member carried by said sleeve member with said actuator member being adapted to move said sleeve member selectively to said first position and said second position so that upon movement of said sleeve member to said first position both shafts are driven as a unit and upon movement of said sleeve member to said second position only one said shaft and the wheel operatively connected thereto is driven by said drive means, and
    (e) at least one handle extending rearwardly from said frame with the forward end thereof connected to said frame and the rear end thereof being adjacent said one end of said elongated actuator member and in easy reach thereof.

* * * * *